United States Patent Office.

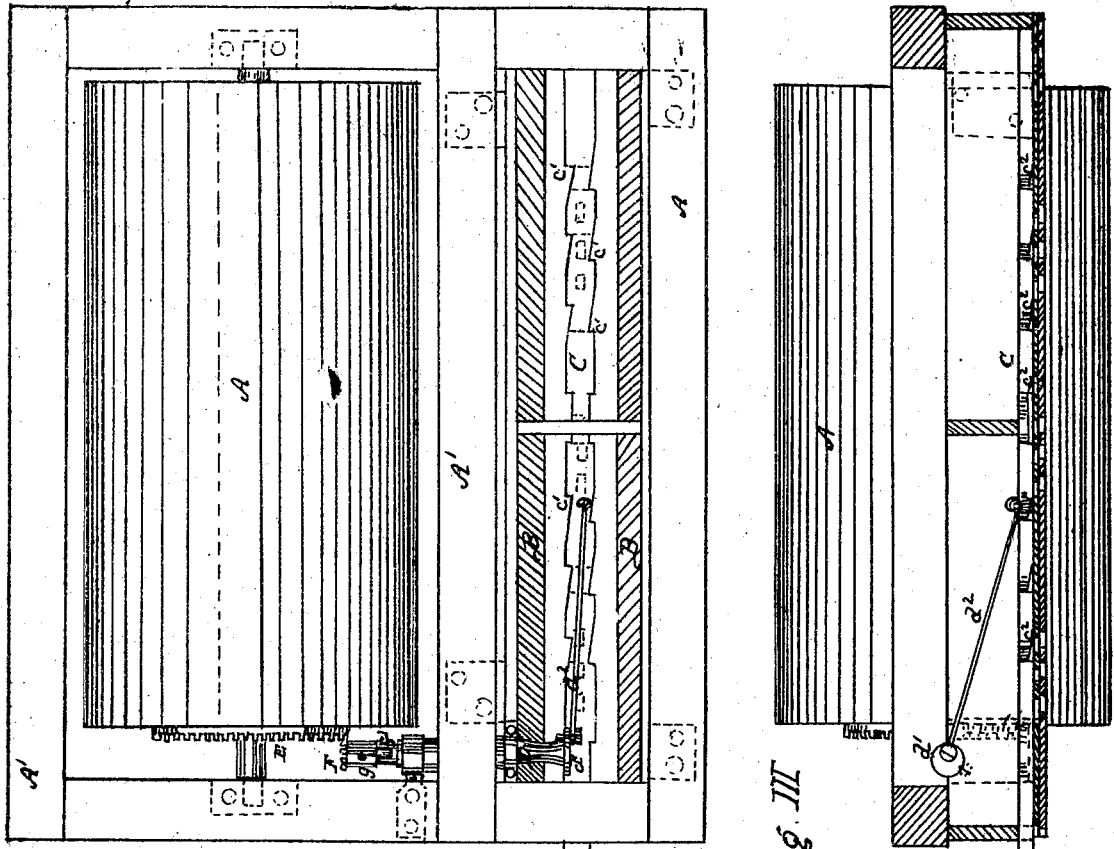
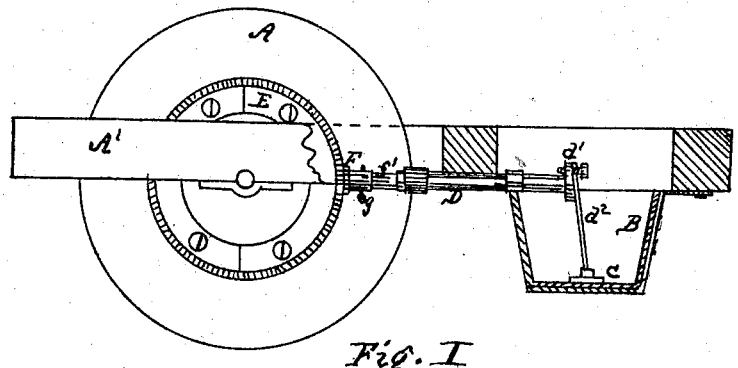

DANIEL WILBER, OF COLLINS CENTRE, NEW YORK.

Letters Patent No. 74,651, dated February 18, 1868.

COMBINED SEED-SOWER AND FIELD-ROLLER.

*The Schedule referred to in these Letters Patent and making part of the same.*

TO ALL WHOM IT MAY CONCERN:

Be it known that I, DANIEL WILBER, of Collins Centre, in the county of Erie, and State of New York, have invented a certain new and improved Combined Seed-Sower and Field-Roller; and I do hereby declare that the following is a full and exact description thereof, reference being had to the accompanying drawings, making a part of this specification, in which—

Figure I is a side elevation.

Figure II is a top plan view, and

Figure III a transverse vertical section through the seed-box.

The nature of this invention relates to the construction of a seeding-machine for sowing broadcast, in combination with and operated by a field-roller, and consists, first, in the construction, operation, and use of a reciprocating bar or slide, supported upon the perforated bottom of the seed-box, and having a row of notches cut or formed upon each side, and also a row of notches upon its lower side, all these notches being arranged in proportion to the openings in the bottom of the seed-box, in such manner that the seed will be guided to said openings at each stroke of the slide, and in the proper quantities to insure a perfectly uniform distribution of the seed; second, in the combination, with said slide, of a horizontal shaft, one end of which is connected, by means of a crank and rod, to the slide, and which is revolved by means of bevel-gearing upon the other end and upon the face or side of the field-roller, all parts being so arranged that the revolution of the field-roller will give a reciprocating movement to the slide; third, making the bevel-pinion loose upon its shaft, in combination with a feather upon the latter, and a set-screw upon the former, for the purpose of putting the pinion in or out of gear, by means of moving the pinion lengthwise upon the shaft, in a manner to disconnect the seeding-apparatus from the roller whenever desired.

Letters of like name and kind refer to like parts in each of the figures.

A represents the field-roller, which supports a rectangular frame, A′, to the front end of which the seed-box B is connected. The bottom of this seed-box is provided with a series of openings for the egress of the seed, which may be arranged at a suitable distance apart.

C represents a bar or slide, which lies upon the bottom of the seed-box, and is provided with a series of notches in its sides, as shown at $c^1$, Fig. II, and another row of notches made in its lower surface, as shown at $c^2$, Fig. III. These notches are so arranged, in relative position to the openings in the bottom of the seed-box, that, as the slide is drawn back and forth, the seed with which the seed-box is kept constantly filled, will enter those notches or cavities, and thereby be divided into the proper equal quantities to be thrown from each opening; hence the distribution of the seed upon the ground will be more uniform than when done by seed-bars now in common use in seeding-machines, and render the clogging or stopping up of the openings by the seed almost impossible.

D represents a horizontal shaft, supported upon the side of the frame A′, and reaching to within the middle of the seed-box. Upon this end a crank, $d^1$, is attached, which is connected to the slide by means of the rod $d^2$. A rotary motion is communicated to the shaft D by means of the bevel-wheel E, upon the end face of the roller, and bevel-pinion F, upon the shaft D, the difference in the diameter of the two being about as one to eight, in order to give the shaft D the required speed. By this arrangement, a uniform and rapid reciprocating motion is given to the slide C, transmitted from the rotary motion of the field-roller. The bevel-wheel E may also be supported independently upon the end of the axis of the roller, outside of the frame, instead of being connected as shown in the drawings, without changing the subject and intent of this invention.

In order to enable the operator to throw the two bevel-wheels in and out of gear, the bevel-pinion F is placed loosely upon the shaft, and made to slide upon a feather, $f'$, upon the shaft D. It may be retained in the proper position, in or out of gear, by means of the pin $g$, or other equivalent device.

What I claim as my invention, and desire to secure by Letters Patent, is—

1. The slide C, having notches or cavities, $c^1$ $c^2$, for the purpose, and substantially as described.

2. The combination, with the slide C, of the shaft D, crank $d^1$, pitman $d^2$, bevel-gearing E F, and field-roller A, all arranged and operating in the manner and for the purpose substantially as set forth.

3. The combination of the bevel-pinion F, placed loose upon the shaft D, the feather $f'$, and pin $g$, or its equivalent, all arranged and operating substantially as and for the purpose described.

DANIEL WILBER.

Witnesses:
A. W. COOK,
B. H. MUEHLE.